Figure 1:
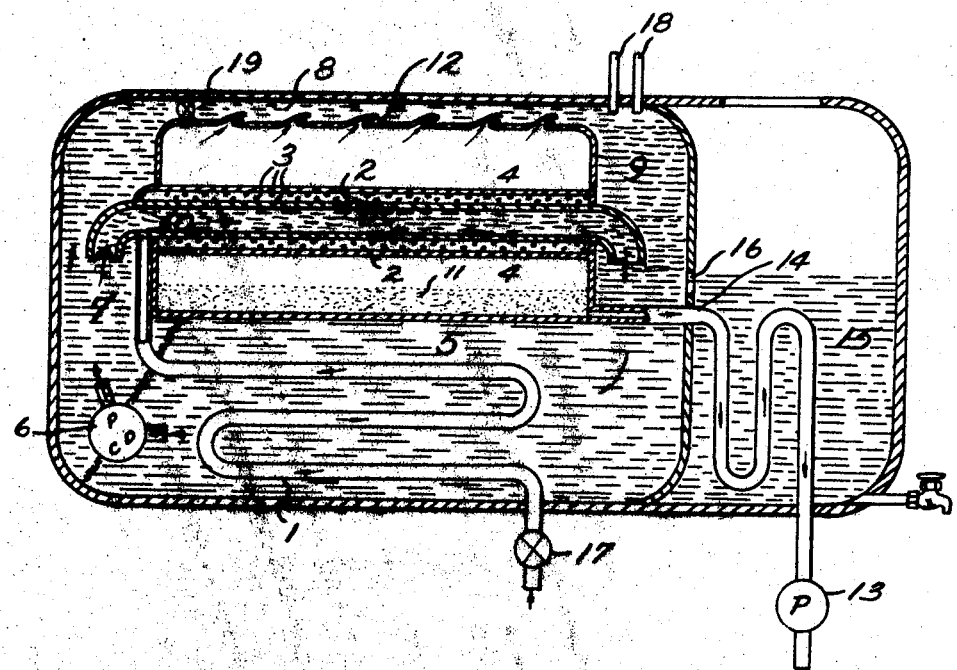

Sept. 14, 1965   J. G. DAVIAU   3,206,380

HYDRAULIC SALT WATER CONVERSION UNIT

Filed March 10, 1960

INVENTOR

JEROME G. DAVIAU

BY

ATTORNEY

3,206,380
HYDRAULIC SALT WATER CONVERSION UNIT
Jerome G. Daviau, 50 Main St., Waterville, Maine
Filed Mar. 10, 1960, Ser. No. 14,157
6 Claims. (Cl. 202—185)

This invention relates to the desalination of water, for example the extraction of fresh water from salt water, brackish and swamp waters, for the purpose of rendering potable these otherwise unsuitable sources of water. The process of this invention is based on variable low to atmospheric pressured vaporization, and the apparatus provided is simple in construction and operation, efficient and durable in use, inexpensive to manufacture and operate for the purposes above stated.

The present invention employs a new method of extracting vapors and gases from a chamber in order to lower its pressure. This is achieved by means of a pipe traversing the length of the chamber, the lower side of which pipe is perforated in order to allow intrusion with small round apertures, opening inside the pipe just below the chamber along the chord of an intruded hydrofoil section, as illustrated, interspaced the entire length of this pipe according to hydrodynamic considerations, and then in a fast flow of fresh water in said pipe to decrease the pressure at each hydrofoil section, which will suck out first the gases in the chamber and then the water vapors which are then assimilated and condensed by the fresh water thus circulated through the pipe. The higher the velocity of fresh water flow in the pipe the lower the pressure obtained. More than one of these pipes may be used if desired.

In this same chamber is an incoming flow of salt water, drawn in by the low pressure attained in the chamber, which salt water is sprayed in the chamber through small apertures. The rest of the device as appears in the drawing indicates an arrangement or combination of parts dictated by thermal considerations all of which will be apparent to those skilled in the art.

Figure 2:

With the above and other objectives and advantages in view this invention consists of novel details of construction, arrangement and combination of parts more fully hereinafter described, claimed and illustrated in the accompanying drawing in which:

FIGURE 1 is a front elevational sectional view of the apparatus of the present invention showing and displaying the manner of arrangement and combination of parts and details of construction; and FIGURE 2 is an enlarged front elevational view also in section of the apparatus of FIGURE 1 showing the operation and construction of the hydrofoil in greater detail.

Referring more in detail to the drawing, FIGURE 1, the reference numeral 1 shows a pipe through which is drawn salt water to be desalinated and from which it is intended to extract pure fresh water. Salt water is drawn through pipe 1 as shown, through enlarged pipe 2, the latter being a continuation and enlargement of pipe 1 with small apertures 3 distributed throughout the length of pipe 2, so as to permit salt water to be sprayed into chamber 4 as illustrated. Tank 5 contains fresh water, previously acquired, circulated by a pump 6 all as shown, drawing water from tank 5 upwards through large pipe 7 and the constricted section of pipe 8 across the top and length of chamber 4, into the enlarged section of pipe 9 and then back to tank 5, which circulation is kept in a continuous cycle by pump 6.

The circulatory course described from tank 5 up through pipe 7 into constricted pipe 8, the latter having an opening through the low pressure area of a hydrofoil inside of pipe 8, develops low pressure areas at 12. This is clearly depicted in the exploded view of FIGURE 2 showing the tubular openings of the hydrofoil and the flow of water and gas as indicated by broken lines and arrows therein. The function of this arrangement will be apparent to those skilled in the art. The pressure is decreased below the point of maximum camber of the hydrofoil as the velocity of water flow in pipe 8 increases, thus acting as a pump in sucking out air and other gas molecules and finally the water vapor molecules.

The decrease of pressure in chamber 4 thus induced results in atmospheric or other pressure forcing salt water through intake pipe 1 then through pipe 2 where it is sprayed into chamber 4 through apertures 3 where, when the pressure and temperature factors are in proper relation to each other, the salt water thus sprayed vaporizes, all of which will be apparent to those skilled in the art.

The water molecules are then drawn into the high velocity fresh water circulating in constricted pipe 8 through tubular openings 12 as hereinbefore described and are assimilated and they thus augment the volume of the fresh water flowing through pipe 8 to pipe 9 and back into tank 5.

The excess fresh water assimilated as previously explained overflows into storage reservoir 15 over threshold 16.

The ends of pipe 10, inserted into perforated pipe 2, have their openings downward as illustrated into the fresh water flow generated by circulation heretofore explained. Thus fresh water is forced from pipe 7 into pipe 10 and circulated therethrough to large pipe 9 as shown, and then downward into tank 5 in a continuous cycle. The purpose of this cycle of fresh water is to impart some of the heat of the fresh water to the incoming salt water in a heat exchanging manner replenishing some of the heat given up by outer pipe 2 as the sprayed salt water is vaporized in chamber 4.

Flutter valve 17 is installed in pipe 1 for the purpose of placing a drag in pipes 1 and 2 so that the pressure in chamber 4 may be lowered sufficiently to properly vaporize incoming salt water of varying temperatures.

Air vents at 18 installed for the purpose of aerating the fresh water produced. Check valve 19 closes when the system stops and thus prevents water from receding in pipe 7 and allows for easier restarting.

The work of pump 6 as well as the assimilation and condensation of water vapor in chamber 4 as previously described will tend to increase the temperature of the fresh water circulatory system in tank 5. Pipe 1 therefore has the configuration shown so as to act as a heat exchanger, fresh warm water in tank 5 imparting its heat to the cold incoming salt water, thus permitting vaporization in chamber 4 at higher pressures as well as dissipating some of the excess heat.

The salt water 11 at the bottom of tank 4 should, after a period of steady operation, be comparatively cool and therefore should be circulated in reservoir 15 through pipe 14 and extracted by pump 13 for the purpose of cooling the usable reserve of fresh water in reservoir 15. Pump 13 should maintain a steady, controlled and predetermined level of salt water 11 in chamber 4.

It is believed that the operation and efficiency of this device and process will result in a more efficient low cost desalination system permitting the recovery of fresh water from salt water and other brackish and swamp waters in a novel manner, departing from the methods of other systems all of which will be apparent to those skilled in the art.

It will be further appreciated and understood that an efficient method of extracting fresh or potable water from salt, brackish and swamp waters at a low cost is the subject of world wide search and research.

It will be further understood that changes in detail of construction, arrangement and combination of parts may be resorted to, provided they fall within the spirit of the invention and the scope of the appended claims.

I claim:

1. A desalination system, comprising: a vessel for fresh water; an inlet pipe for relatively cool salt water extending into said vessel; a receptacle within said vessel; a perforated conduit in said receptacle closed at one end and communicating at its other end with said inlet pipe; a heat exchanger tube within said perforated conduit having open ends extending outwardly of said receptacle and communicating with the interior of said vessel, said receptacle having an upper wall with aspirating means incorporated therein; a circulating pump in said vessel arranged to force fresh water from said vessel at high velocity over said aspirating means to thereby reduce the pressure in said receptacle and to induce flow of salt water through said inlet pipe for discharge through said perforations and evaporation in said receptacle, said high velocity fresh water further condensing said aspirated vapors, and to force water from said vessel through said heat exchange tube to increase the temperature of the salt water in said perforated conduit to further facilitate evaporation thereof.

2. A desalination system as defined in claim 1, including an adjustable valve in the salt water inlet pipe for maintaining a resistance to the flow induced by the aspirating means.

3. A desalination system as defined in claim 1, wherein the aspirating means comprises a hydrofoil surface over which the high velocity stream of water is forced, and an opening adjacent said hydrofoil surface in which suction is induced by the stream passing over said airfoil surface.

4. A desalination system as defined in claim 1, in which the salt water inlet pipe includes portions disposed within the fresh water in said vessel and serving as a heat exchanger.

5. A desalination system as defined in claim 1, including means for withdrawing salt water from said receptacle.

6. A desalination system as defined in claim 1, including means for withdrawing fresh water from the vessel.

References Cited by the Examiner

UNITED STATES PATENTS

| 236,940 | 1/81 | Faesch | 202—75 X |
|---|---|---|---|
| 541,781 | 6/95 | Wheeler | 230—92 |
| 585,365 | 6/97 | Skiffington. | |
| 1,777,816 | 10/30 | Wittinghon. | |
| 2,423,307 | 7/47 | Fraser. | |
| 2,441,361 | 5/48 | Kirgan | 202—75 |
| 2,489,703 | 11/49 | Cook et al. | 202—52 |
| 2,507,632 | 5/50 | Hickman | 230—92 |
| 2,619,453 | 11/52 | Anderson | 202—75 |

FOREIGN PATENTS

| 515,138 | 1939 | Great Britain. |
|---|---|---|

NORMAN YUDKOFF, *Primary Examiner*.

R. D. NEVIUS, GEORGE D. MITCHELL, A. D. SULLIVAN, *Examiners*.